United States Patent
Park

(10) Patent No.: US 7,441,921 B2
(45) Date of Patent: Oct. 28, 2008

(54) BACKLIGHT UNIT AND METHOD OF DRIVING THE SAME

(75) Inventor: Sin Kyun Park, Gyeongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/476,743

(22) Filed: Jun. 29, 2006

(65) Prior Publication Data
US 2007/0001626 A1 Jan. 4, 2007

(30) Foreign Application Priority Data
Jun. 30, 2005 (KR) .............. 10-2005-0058415

(51) Int. Cl.
F21S 4/00 (2006.01)
(52) U.S. Cl. ........... 362/221; 362/240; 362/613; 362/614; 362/634; 362/611; 313/312; 349/56; 349/70; 349/21; 349/149; 323/224; 315/219
(58) Field of Classification Search ............ 362/221, 362/613, 240; 315/312, 219; 349/1, 56, 349/21, 70; 323/224; 345/102
See application file for complete search history.

(56) References Cited
U.S. PATENT DOCUMENTS

| 7,126,286 | B2 * | 10/2006 | Yoo et al. ............ 315/219 |
| 2004/0061429 | A1 * | 4/2004 | Sakai et al. ............ 313/491 |
| 2005/0078080 | A1 * | 4/2005 | Kang et al. ............ 345/102 |
| 2005/0141220 | A1 * | 6/2005 | Kim et al. ............ 362/240 |
| 2005/0225708 | A1 * | 10/2005 | Oke et al. ............ 349/139 |
| 2005/0243260 | A1 * | 11/2005 | Kim ............ 349/149 |

FOREIGN PATENT DOCUMENTS

KR 2005120883 A * 12/2005

* cited by examiner

Primary Examiner—Stephen F. Husar
Assistant Examiner—Jessica L. McMillan
(74) Attorney, Agent, or Firm—Holland & Knight LLP

(57) ABSTRACT

A backlight unit includes at least one cold cathode fluorescent lamp arranged at a lower end of a bottom cover, external electrode fluorescent lamps arranged on the bottom cover above the cold cathode fluorescent lamp, and inverters disposed on a rear side of the bottom cover for driving the at least one cold cathode fluorescent lamp and the external electrode fluorescent lamps.

20 Claims, 5 Drawing Sheets

Parasitic capacitance

BACKLIGHT UNIT AND METHOD OF DRIVING THE SAME

This application claims the benefit of Korean Patent Application No. P2005-058415, filed on Jun. 30, 2005, which is hereby incorporated by reference in its entirety.

BACKGROUND OF THE INVENTION

1. Field of the Invention

The present invention relates to a lighting unit, and more particularly, to a backlight unit and a method of driving the same. Although the present invention is suitable for a wide scope of applications, it is particularly suitable for preventing parasitic capacitance from a lamp positioned at a lower end of the backlight unit and to allow quick initial driving of a lamp.

2. Discussion of the Related Art

A cathode ray tube (CRT) is a related art display device that has been used as a monitor in TV sets, metering devices, information terminals and the like. However, the CRT has a large size and a heavy weight. Because the current trend in electronics has been to reduce size and weight, various types of display devices have been investigated to replace the CRT. More specifically, flat panel display devices, such as liquid crystal display (LCD) devices using an electro-optic effect, plasma display panel (PDP) devices using gas discharge, electroluminescence display (ELD) devices using an electric field light emitting effect, have been investigated to replace the CRT. Among these flat panel display devices, the LCD device has the advantages of light weight, thin profile and low power consumption. Thus, LCD devices are used as monitors for desk-top computers and large size information display devices as well as monitors for lap-top computers. Since most LCD devices are light receiving type devices, which display an image by regulating quantity of light entering from a light source is needed. A backlight is typically used as a light source for providing light to an LCD panel.

Generally, the backlight unit, which is used as the light source of an LCD device, includes at least one cylindrical fluorescent lamp as a light source. Backlight units can be classified as either an edge light type or a direct light type. In the edge light type backlight unit, a lamp unit is positioned at one side of a light guide plate, which guides the light across the LCD panel, a lamp to emit light within the lamp unit, lamp holders at both sides of the lamp within the lamp unit, and a lamp reflection plate within the lamp unit to reflect light emitted from the lamp towards the light guide plate. The edge type backlight unit with the lamp unit positioned at the side of the light guide plate is used in relatively small-sized liquid crystal display device, such as monitors for lap-top computers and desk-top computers. The edge type backlight unit provides good light uniformity, long endurance, and has a thin profile.

The direct light type has been developed so as to be able to provide enough light to an LCD device having a size of 20 inches or more. More specifically, the direct light type has a plurality of light sources positioned on a lower surface of a diffusion plate such that light is directly illuminated toward a rear side of an LCD panel. Since the direct light type has a higher light utilization efficiency than the edge light type, the direct light type is used for large LCD devices, which require a large amount of light. However, the direct light type backlight unit for use in an LCD device of a large monitor or a large TV screen has many light sources. Further, the light sources are used for a long period of time. Thus, the image quality of such LCD devices suffer when a light source goes out due to defects in the or burns out from long time use.

An electroluminescent lamp (EL), a light emitting diode (LED), a cold cathode fluorescent lamp (CCFL), a hot cathode fluorescent lamp (HCFL), or an external electrode fluorescent lamp (EEFL) may be used as a light source in either the edge type backlight unit or the direct light type backlight unit.

FIG. 1 is a schematic perspective view illustrating a related art light type backlight unit. As shown in to FIG. 1, a related art backlight unit includes a plurality of lamps 1, a case frame 3 to secure and hold the lamps 1, and light scattering members 5a, 5b and 5c disposed between the lamps 1 and a liquid crystal panel (not shown). The case frame 3 has a reflection sheet 7 disposed on an inner surface thereof to allow light emitted from the lamps 1 to be redirected toward a display part of the liquid crystal panel. Each of the lamps 1 is a cold cathode fluorescent lamp (CCFL), which includes electrodes (not shown) at both inner ends of the lamp tube to emit light when power is applied to the electrodes. The ends of each of the lamps 1 are fitted into grooves at both sides of the case frame 3. Both electrodes of each lamp 1 are connected to power input wires 9a and 9b, which are connected with a driving circuit via a separate connector (not shown), to transmit power for driving the lamp. Thus, each of the lamps 1 requires a separate connector. The power input wires 9a and 9b for a lamp are connected with a single connector in such a way that one of the power input wires 9a and 9b runs below the case frame 3 for connection with the connector.

FIGS. 2A and 2B are a plan view and a rear view of another related art direct light type backlight unit, respectively. As shown in FIGS. 2A and 2B, another related art backlight unit includes a plurality of external electrode fluorescent lamps (EEFLs) 11 arranged in constant intervals on a bottom cover 10. Each of the plurality of EEFLs 11 has first and second electrodes 12a and 12b at both ends on an outer surface of the lamp tube. First and second common electrodes 13a and 13b are respectively arranged at both ends of the plurality of EEFLs 11 to apply driving current to the first and second electrodes 12a and 12b of each EEFLs 11. First and second inverter PCBs 14a and 14b are disposed on a rear side of the bottom cover 10 to apply the driving current to the first and second common electrodes 13a and 13b. First and second transformers 15a and 15b respectively provide driving voltages to the first and second inverter PCBs 14a and 14b. First and second wires 17a and 17b are respectively connected between the first and second common electrodes 13a and 13b and the first and second transformers 15a and 15b. The first and second wires 17a and 17b are connected with the first and second transformers 17a and 17b via first and second connectors 16a and 16b, respectively.

FIG. 3 is a view illustrating a construction problem of the related art direct light type backlight unit shown in FIGS. 2A and 2B, and FIG. 4 is a view illustrating a waveform of voltage applied to common electrodes of the backlight unit shown in FIG. 3. In the related art backlight unit including the EEFLs as described above, the first and second electrodes 12a and 12b of each lamp 11 are connected in parallel with the first and second common electrodes 13a and 13b, and drive the first and second common electrodes 13a and 13b. Alternating current of the same waveform, as shown in FIG. 4, is applied to the first and second common electrodes 13a and 13b.

When the current of the same waveform is applied to the first and second common electrodes 13a and 13b, and drives the first and second common electrodes 13a and 13b in parallel, a parasitic capacitance occurs between the bottom cover 10 and the lamps 11 at a lower end of the bottom cover 10 near the lower end of a liquid crystal display screen causing a current leakage. The parasitic capacitance unbalances the impedance of the lamps arranged at the lower end of the liquid crystal display screen, and thus deteriorates the brightness of the lamps at the lower end of the liquid crystal display device. Further, the backlight unit including CCFL or EEFLs as described above has a problem in that, when the backlight unit remains in darkness or at low temperatures for a long period of time, such as when the backlight unit remains in a non-driven state for a long period of time, initial start-up or re-driving of the lamps is difficult.

SUMMARY OF THE INVENTION

Accordingly, the present invention is directed to a backlight unit and a method of driving the same that substantially obviate one or more problems due to limitations and disadvantages of the related art.

An object of the present invention is to provide a backlight unit, which can prevent parasitic capacitance from being generated from a lamp positioned at a lower end thereof to enhance uniformity in brightness of the backlight unit.

It is another object of the present invention to provide a backlight unit adapted to allow initial driving of the lamp to be easily performed when re-driving the lamp which has been turned-off or maintained at low temperature for a long period of time, and a method of driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a backlight unit including at least one cold cathode fluorescent lamp arranged at a lower end of a bottom cover, external electrode fluorescent lamps arranged on the bottom cover above the cold cathode fluorescent lamp, and inverters disposed on a rear side of the bottom cover for driving the at least one cold cathode fluorescent lamp and the external electrode fluorescent lamps.

In accordance with another aspect of the present invention, there is provided a backlight unit including a cold cathode fluorescent lamp at a lower end of a bottom cover and having first and second inner electrodes, external electrode fluorescent lamps arranged on the bottom cover above the cold cathode fluorescent lamps, and each of which has first and second external electrodes, and first and second common electrodes at both ends of the external electrode fluorescent lamps that respectively contact the first and second external electrodes of each external electrode fluorescent lamp.

In accordance with another aspect of the present invention, there is provided a method of driving a backlight unit having a cold cathode fluorescent lamp arranged at a lower end of a bottom cover, and external electrode fluorescent lamps arranged on the bottom cover above the cold cathode fluorescent lamp, the method including applying alternating current to the cold cathode fluorescent lamp arranged at the lower end of the bottom cover, and applying alternating current to the external electrode fluorescent lamps in a phase shifting manner after sequentially applying the alternating current to the cold cathode fluorescent lamp.

In accordance with yet another aspect of the present invention, there is provided a backlight unit including a cold cathode fluorescent lamp at a lower end of a bottom cover and having first and second inner electrodes, external electrode fluorescent lamps arranged on the bottom cover above the cold cathode fluorescent lamps, and each of which has first and second external electrodes, plural pairs of fastening members separated from each other while defining a slit in each pair of fastening members for holding the first or second external electrodes therein; and a first or second common electrode line on both sides of the pairs of fastening members to connect the fastening members with each other.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
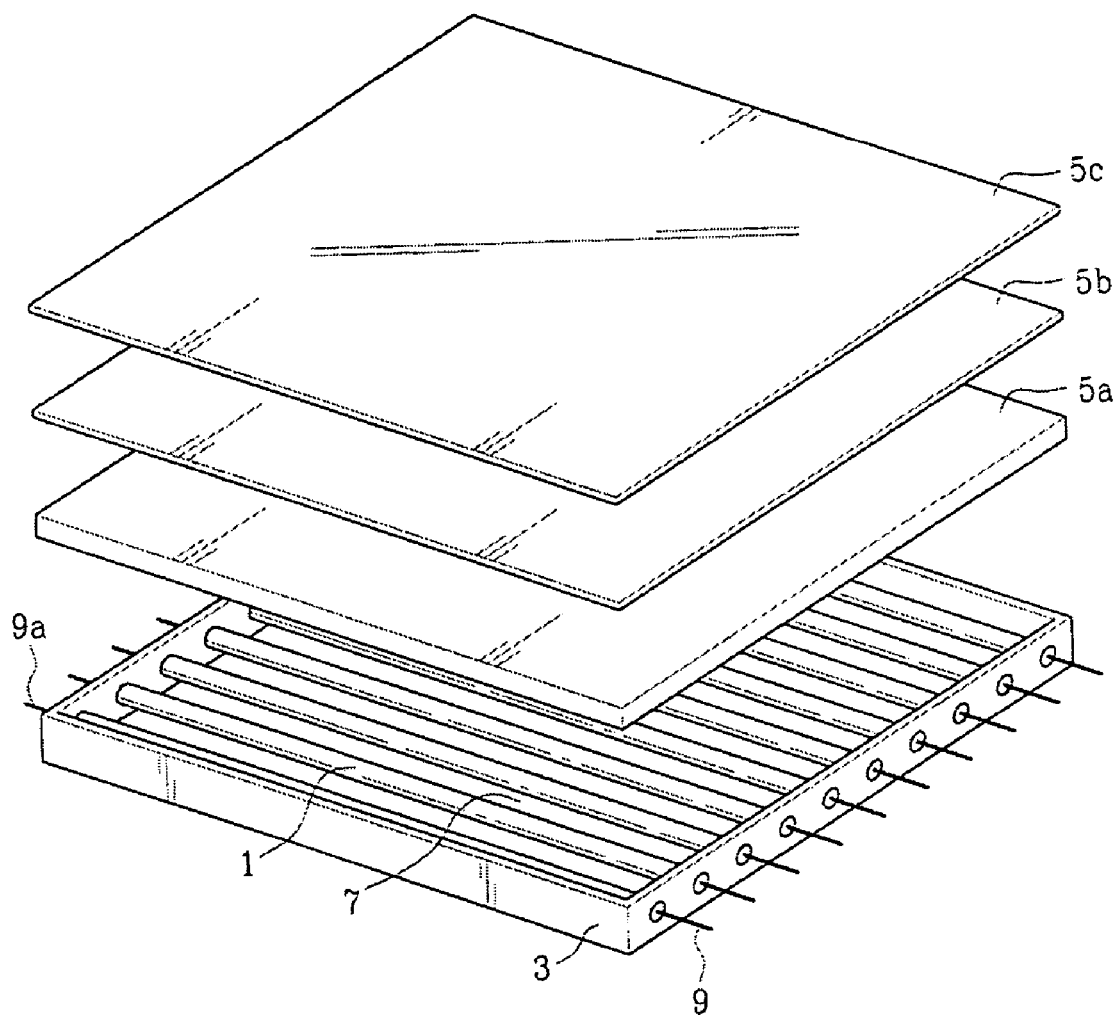
FIG. 1 is a schematic perspective view illustrating a related art direct light type backlight unit.
Figure 2A:
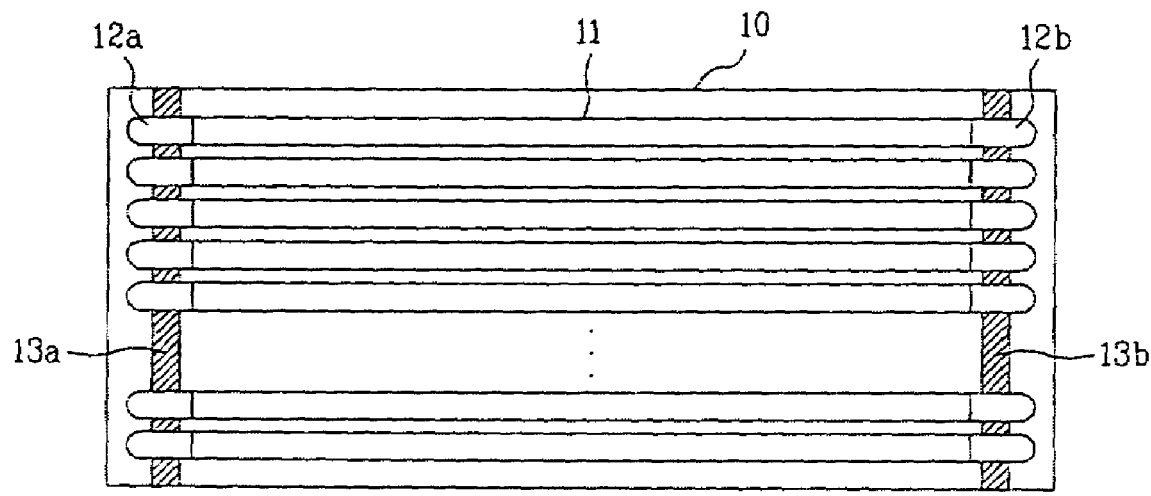
FIGS. 2A and 2B are a plan view and a rear view of another related art direct light type backlight unit, respectively.
Figure 2B:
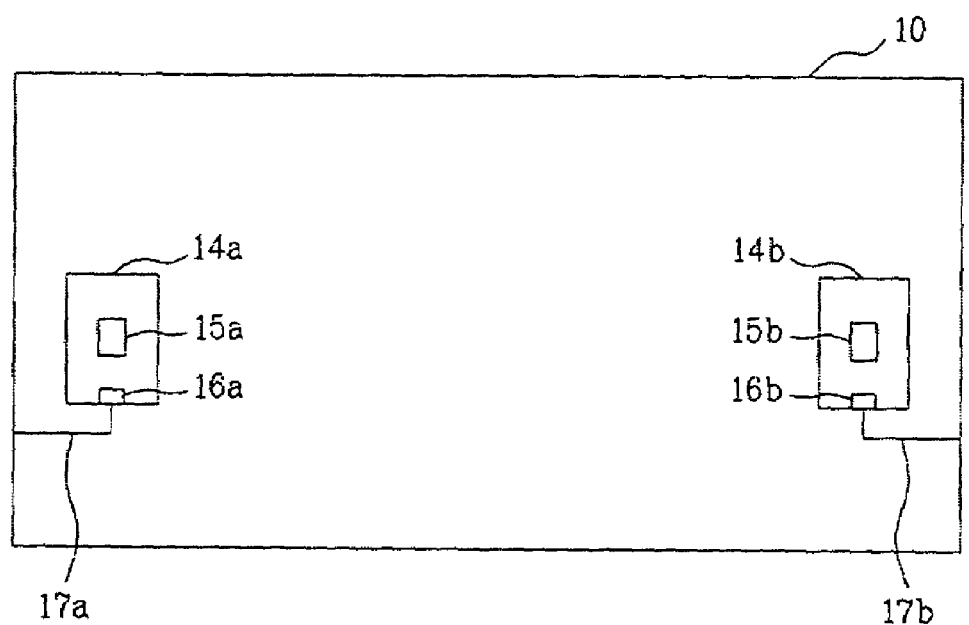
Figure 3:
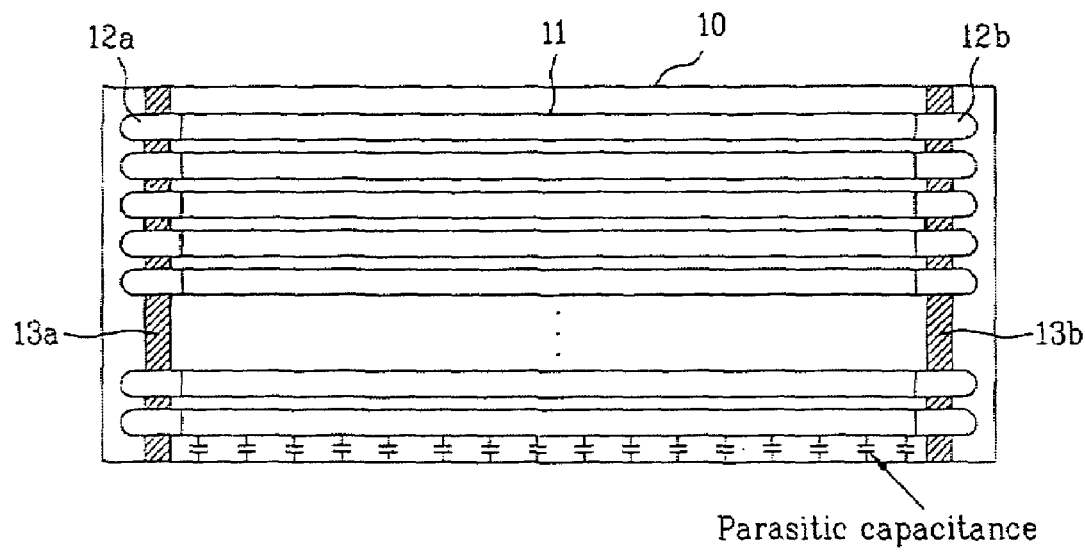
FIG. 3 is a view illustrating a construction problem of a related art direct light type backlight unit shown in FIGS. 2A and 2B.
Figure 4:
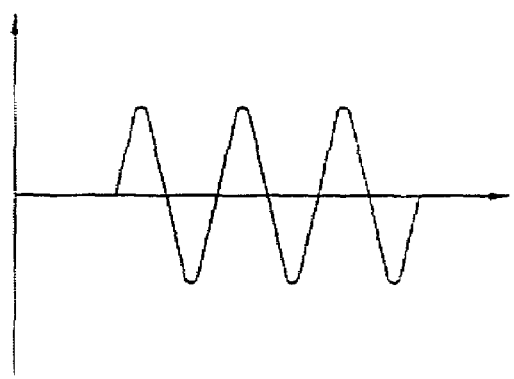
FIG. 4 is a view illustrating a waveform of voltage applied to common electrodes of the backlight unit shown in FIG. 3.
Figure 5:
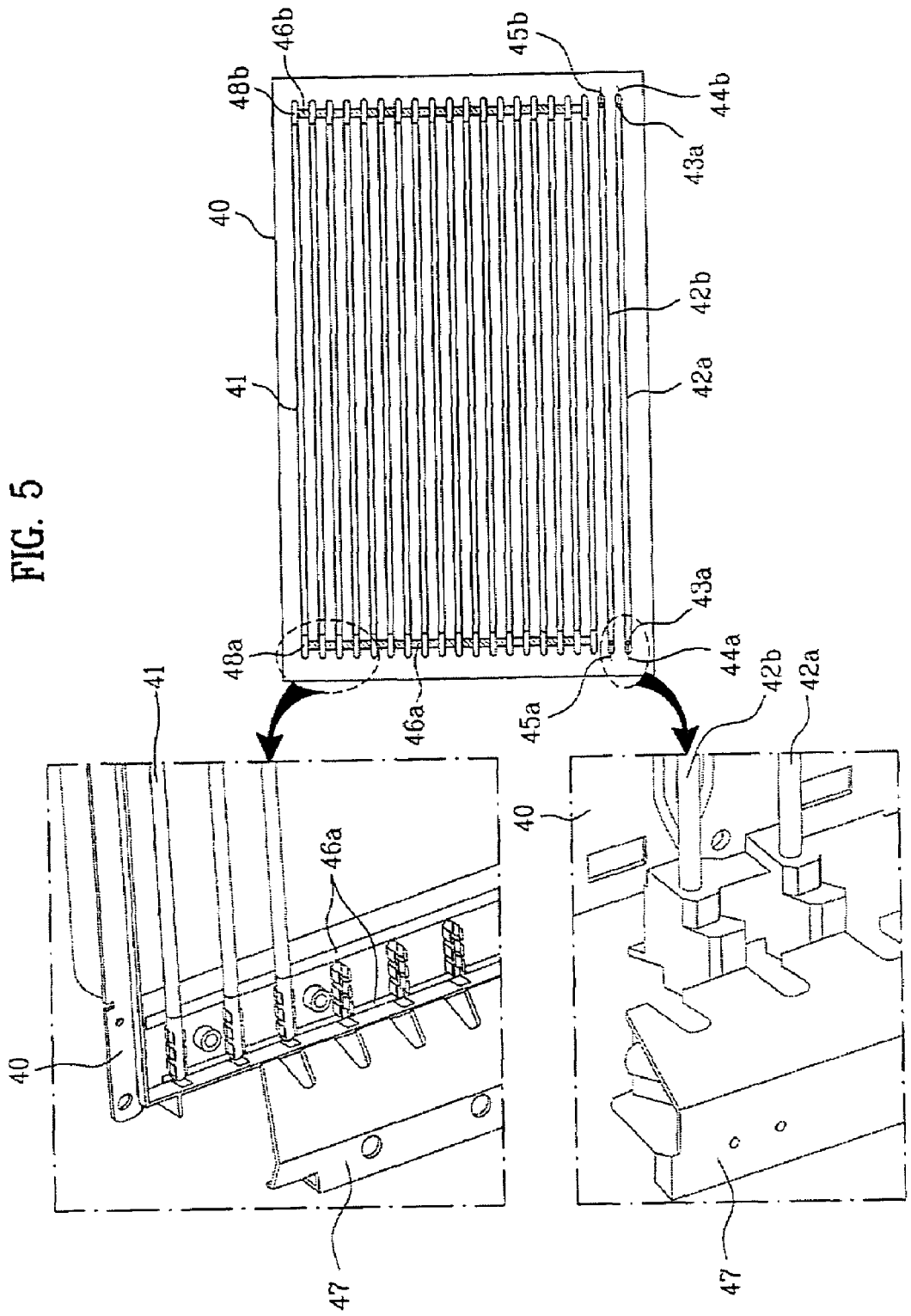
FIGS. 5 and 6 are a top view and a rear view illustrating a backlight unit in accordance with an embodiment of the present invention, respectively.
Figure 6:
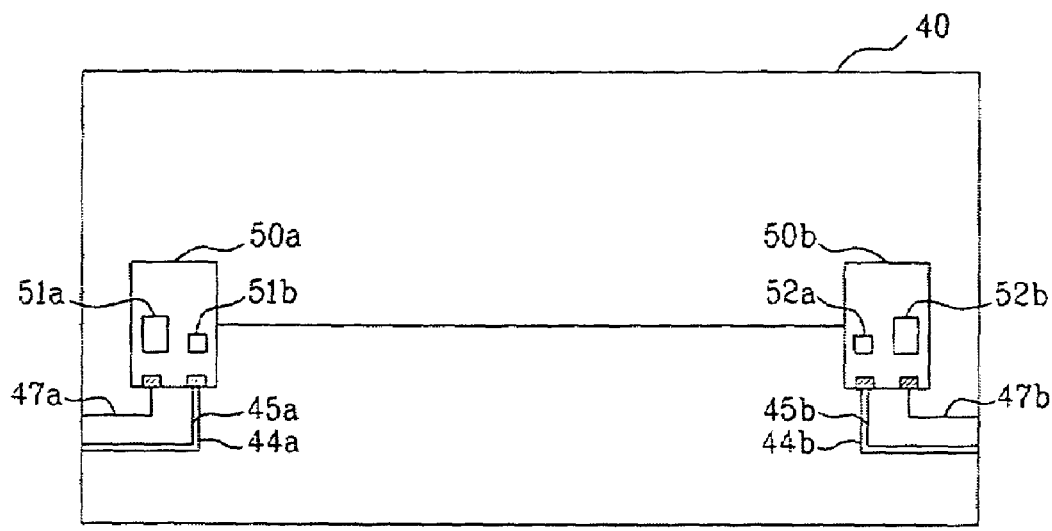
Figure 7:
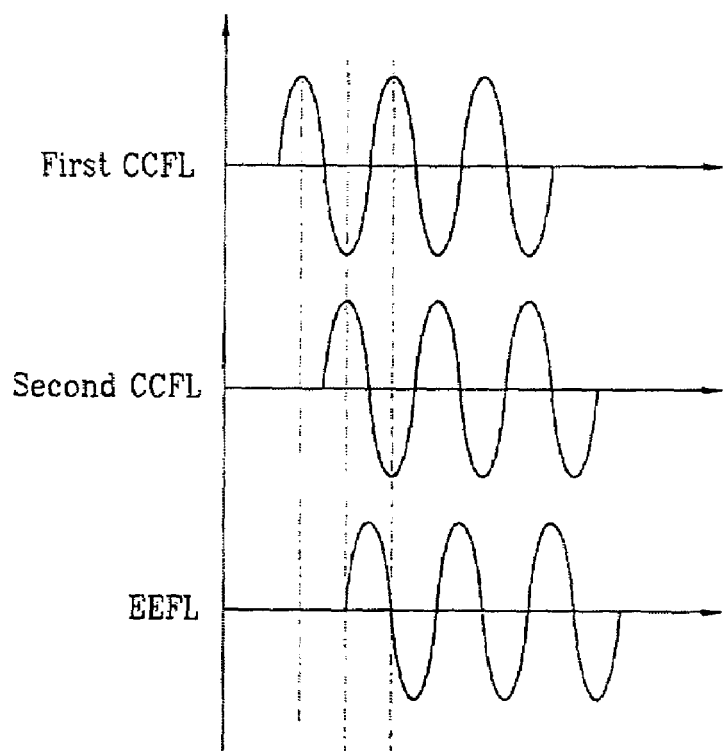
FIG. 7 is a view illustrating a waveform of voltage applied to common electrodes and two power input lines of an embodiment of the present invention.

FIGS. 5 and 6 are a top view and a rear view illustrating a backlight unit in accordance with an embodiment of the present invention, respectively. FIG. 7 is a view illustrating a waveform of voltage applied to common electrodes and two power input lines of an embodiment of the present invention. Referring to FIGS. 5 and 6, according to an embodiment of the present invention, the backlight unit includes first and second cold cathode fluorescent lamps 42$a$ and 42$b$ arranged in a first direction at a lower end of a bottom cover 40 in which each of the first and second cold cathode fluorescent lamps 42$a$ and 42$b$ has first and second inner electrodes 43$a$ and 43$b$, a plurality of external electrode fluorescent lamps 41 arranged in constant intervals on the bottom cover 40 above the cold cathode fluorescent lamps 42$a$ and 42$b$ in which each of the plurality of external electrode fluorescent lamps 41 has first and second external electrodes 48$a$ and 48$b$ at opposite ends on an outer surfaces of the plurality of external electrode fluorescent lamps 41, first and second common electrodes 46a and 46b arranged in a second direction at both ends of the external electrode fluorescent lamps 41 to apply common driving current to the first and second external electrodes 48a and 48b of each external electrode fluorescent lamp 41, first and second inverter PCBs 50a and 50b disposed on a rear side of the bottom cover 40 to apply the driving current to the first and second common electrodes 46a and 46b, first and second transformers 51a and 51b provided on the first inverter PCB 50a, and third and fourth transformers 52a and 52b provided on the second inverter PCB 50b.

The backlight unit also includes upper structures 47 provided at both ends of the external electrode fluorescent lamps 41, and the first and second cold cathode fluorescent lamps 42a and 42b. The number of cold cathode fluorescent lamps is determined based upon an overall area and manufacturing costs of the backlight unit. The backlight unit of embodiments of the present invention may include one or more cold cathode fluorescent lamps. In the following description of FIGS. 5 and 6, a backlight unit having two cold cathode fluorescent lamps will be described as an example. Embodiments of the present invention are not limited to a backlight unit only having two cold cathode fluorescent lamps.

A first electric wire 47a is connected between the first common electrode 46a and the first transformer 51a, and a second electric wire 47b is connected between the second common electrode 46b and the third transformer 52a. Third and fourth electric wires 44a and 45a are connected between the first inner electrodes 43a of the first and second cold cathode fluorescent lamps 42a and 42b and the second transformer 51b. Fifth and sixth electric wires 44b and 45b are connected between the second inner electrodes 43b of the first and second cold cathode fluorescent lamps 42a and 42b and the fourth transformer 52b. Each of the inverter PCBs 50a and 50b is provided with a connector to connect an associated electric wire with a corresponding transformer. The first and second inverter PCBs 50a and 50b are connected via a synchronization cable.

The first and second common electrodes 46a and 46b may be gripper type electrodes to secure the first and second external electrodes 48a and 48b of each external electrode fluorescent lamp 41, as shown in FIG. 5. More specifically, each of the first and second common electrodes 46a and 46b includes plural pairs of fastening members separated from each other while having a slit in each pair of fastening members for holding the first or second external electrodes 48a or 48b therein. Further, the first and second common electrodes 46a and 46b include first and second common electrode line formed on both sides of the pairs of fastening members to connect the fastening members with each other, a stopper formed vertically at a distal end of the first and second common electrode lines such that a distal end of each external electrode fluorescent lamp 41 is seated thereon to prevent the external electrode fluorescent lamp 41 from sliding to the right or left side when assembling the external electrode fluorescent lamp 41, and a plurality of holes in where screws are fastened.

The gripper type electrodes surrounds the external electrode fluorescent lamp 41 to reduce defective contact due to misalignment. Further, the gripper type electrodes maximize contact area with the external electrode fluorescent lamp 41 to enhance electrical continuity. Although the first and second common electrodes 46a and 46b have been described as the gripper type electrodes in this embodiment, embodiments of the present invention are not limited to gripper type electrodes. Both ends of the first and second cold cathode fluorescent lamps 42a and 42b are adapted to allow the lamps to be secured via lamp holders, each of which has a tube-shaped hole.

As described above, the backlight unit in embodiments of the present invention has the structure in which first and second cold cathode fluorescent lamps 42a and 42b are arranged at the lower end of the bottom cover 40 at a location corresponding to a lower end of a liquid crystal display screen while the plural external electrode fluorescent lamps 41 are arranged at other locations. In addition, the cold cathode fluorescent lamps and the external electrode fluorescent lamps are connected with different transformers, respectively. Thus, the cold cathode fluorescent lamps and are independently driven from the external electrode fluorescent lamps.

With the cold cathode fluorescent lamps arranged at the lower end of the bottom cover 40 and the external electrode fluorescent lamps arranged above the cold cathode fluorescent lamps, the external electrode fluorescent lamps of the backlight unit can be driven in parallel while the cold cathode fluorescent lamps are driven separately from the external electrode fluorescent lamps. Parallel driving of the external electrode fluorescent lamps lowers manufacturing costs by reducing the number of electric wires and transformers on the inverter PCBs. Since the cold cathode fluorescent lamps arranged at the lower end are separately controlled from the external electrode fluorescent lamps, parasitic capacitance does not affect the external electrode fluorescent lamps in the backlight unit.

In the backlight unit according to embodiments of the present invention, the first cold cathode fluorescent lamp 42a, the second cold cathode fluorescent lamp 42b, and the external electrode fluorescent lamps 41 are sequentially driven as shown in FIG. 7. In other words, alternating current is sequentially applied to the lamps in sequence from the first cold cathode fluorescent lamp 42a a disposed on the lower end of the bottom cover 40 in a phase shifting manner. When the first cold cathode fluorescent lamp 42a, the second cold cathode fluorescent lamp 42b, and the external electrode fluorescent lamps 41 are sequentially driven in the phase shift manner as described above, abrupt conversion of input current is prevented and current in rush is reduced, and the cold cathode fluorescent lamps can be individually driven first in an initial driving stage so as to allow efficient parallel driving of the external electrode fluorescent lamps.

The cold cathode fluorescent lamps can be initially started-up with ease. In contrast, if the external electrode fluorescent lamps are dark or at low temperatures for a long period of time, the external electrode fluorescent lamps revert to a ground state from which initial start-up takes some time. However, according to embodiments of the present invention, since the cold cathode fluorescent lamps are arranged at the lower end of the bottom cover and the external electrode fluorescent lamps are arranged thereon above the cold cathode fluorescent lamps, the external electrode fluorescent lamps in the ground state can be easily activated by virtue of light emitted from the cold cathode fluorescent lamps by driving the cold cathode fluorescent lamps of the lower end first, thereby providing an effect of instant start up upon parallel driving of the external electrode fluorescent lamps.

In embodiments of the present invention, the structure wherein the cold cathode fluorescent lamps are arranged at the lower end of the bottom cover, and the external electrode fluorescent lamps are arranged thereon above the cold cathode fluorescent lamps, the number of electric wires and transformers in the inverter PCBs are reduced, thereby lowering manufacturing costs by virtue of parallel driving of the external electrode fluorescent lamps. Since the cold cathode fluorescent lamps at the lower end are separately controlled, it is possible to prevent a parasitic capacitance from degrading light output, thereby enhancing uniformity in the brightness of the backlight unit to provide high performance for the LCD device. The cold cathode fluorescent lamps are arranged at the lower end of the bottom cover, and the external electrode fluorescent lamps are arranged thereon above the cold cathode fluorescent lamps, when the cold cathode fluorescent lamps and the external electrode fluorescent lamps are sequentially driven at an initial driving stage of the lamps at a ground state to prevent abrupt conversion of input current, thereby reducing current in rush while ensuring efficient initial driving of the lamps. Thus, the backlight unit embodiments of the present invention can have enhanced uniformity of light output and increased brightness.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A backlight unit, comprising:
    at least one cold cathode fluorescent lamp having internal electrodes and arranged at a lower end of a bottom cover;
    external electrode fluorescent lamps arranged on the bottom cover above the cold cathode fluorescent lamp; and
    inverters disposed on a rear side of the bottom cover for driving the at least one cold cathode fluorescent lamp and the external electrode fluorescent lamps.

2. The backlight unit according to claim 1, wherein the inverters include first and second transformers for driving the at least one cold cathode fluorescent lamp, and third and fourth transformers for driving the external electrode fluorescent lamps.

3. The backlight unit according to claim 1, wherein the external electrode fluorescent lamps are connected in parallel.

4. The backlight unit according to claim 1, further comprising first and second common electrodes at both ends of the external electrode fluorescent lamps that respectively contact first and second external electrodes of each external electrode fluorescent lamp.

5. A backlight unit, comprising:
    a cold cathode fluorescent lamp at a lower end of a bottom cover and having first and second inner electrodes;
    external electrode fluorescent lamps arranged on the bottom cover above the cold cathode fluorescent lamps, and each of which has first and second external electrodes; and
    first and second common electrodes at both ends of the external electrode fluorescent lamps that respectively contact the first and second external electrodes of each external electrode fluorescent lamp.

6. The backlight unit according to claim 5, further comprising:
    first and second inverter printed circuit boards disposed on a rear side of the bottom cover;
    first and second transformers provided on the first inverter printed circuit board to supply power to the first inner electrode of the cold cathode fluorescent lamp and to the first external electrode of each external electrode fluorescent lamp; and
    third and fourth transformers provided to the second inverter printed circuit board to supply power to the second inner electrode of the cold cathode fluorescent lamp and to the second external electrode of each external electrode fluorescent lamp.

7. The backlight unit according to claim 6, further comprising:
    a first electric wire connected between the first common electrode and the first transformer; and
    a second electric wire connected between the second common electrode and the third transformer.

8. The backlight unit according to claim 7, further comprising a third electric wire connected between the first inner electrodes of the cold cathode fluorescent lamps and the second transformer, and a fourth electric wire connected between the second inner electrodes of the cold cathode fluorescent lamps and the fourth transformer.

9. The backlight unit according to claim 6, further comprising a synchronization cable interconnecting the first and second inverter printed circuit boards.

10. The backlight unit according to claim 5, wherein the first and second common electrodes are gripper type electrodes to secure the first and second external electrodes of each of the external electrode fluorescent lamps.

11. The backlight unit according to claim 5, wherein each of the first and second common electrodes includes:
    plural pairs of fastening members separated from each other while defining a slit in each pair of fastening members for holding the first or second external electrodes therein;
    first or second common electrode line on both sides of the pairs of fastening members to connect the fastening members with each other; and
    a stopper formed vertically at a distal end of the first and second common electrode lines such that a distal end of each external electrode fluorescent lamp is seated thereon.

12. The backlight unit according to claim 5, further comprising upper structures on both ends of the cold cathode fluorescent lamps and the external electrode fluorescent lamps to cover the lamps.

13. The backlight unit according to claim 5, further comprising lamp holders disposed at both ends of the cold cathode fluorescent lamps.

14. A method of driving a backlight unit, the backlight unit having a cold cathode fluorescent lamp having internal electrodes and arranged at a lower end of a bottom cover, and external electrode fluorescent lamps arranged on the bottom cover above the cold cathode fluorescent lamp, the method comprising:
    applying alternating current to the cold cathode fluorescent lamps having internal electrodes and arranged at the lower end of the bottom cover; and
    applying alternating current to the external electrode fluorescent lamps in a phase shifting manner after sequentially applying the alternating current to the one cold cathode fluorescent lamp.

15. A backlight unit, comprising:
    a cold cathode fluorescent lamp at a lower end of a bottom cover and having first and second inner electrodes;
    external electrode fluorescent lamps arranged on the bottom cover above the cold cathode fluorescent lamps, and each of which has first and second external electrodes;
    plural pairs of fastening members separated from each other while defining a slit in each pair of fastening members for holding the first or second external electrodes therein; and
    a first or second common electrode line on both sides of the pairs of fastening members to connect the fastening members with each other.

16. The backlight unit according to claim 15, further comprising:

first and second inverter printed circuit boards disposed on a rear side of the bottom cover;

first and second transformers provided on the first inverter printed circuit board to supply power to the first inner electrode of the cold cathode fluorescent lamp and to the first external electrode of each external electrode fluorescent lamp; and third and fourth transformers provided to the second inverter printed circuit board to supply power to the second inner electrode of the cold cathode fluorescent lamp and to the second external electrode of each external electrode fluorescent lamp.

17. The backlight unit according to claim 16, further comprising:

a first electric wire connected between the first common electrode and the first transformer; and a second electric wire connected between the second common electrode and the third transformer.

18. The backlight unit according to claim 17, further comprising a third electric wire connected between the first inner electrodes of the cold cathode fluorescent lamps and the second transformer, and a fourth electric wire connected between the second inner electrodes of the cold cathode fluorescent lamps and the fourth transformer.

19. The backlight unit according to claim 16, further comprising a synchronization cable interconnecting the first and second inverter printed circuit boards.

20. The backlight unit according to claim 15, further comprising lamp holders disposed at both ends of the cold cathode fluorescent lamps.

\* \* \* \* \*